United States Patent
Brunning

(10) Patent No.: US 10,129,310 B1
(45) Date of Patent: Nov. 13, 2018

(54) IN-APPLICATION DEMONSTRATION USING VIDEO AND DATA STREAMS

(71) Applicant: Twitch Interactive, Inc., San Francisco, CA (US)

(72) Inventor: Christopher David Brunning, Rugby (GB)

(73) Assignee: Twitch Interactive, Inc., San Francisco, CA (US)

( * ) Notice: Subject to any disclaimer, the term of this patent is extended or adjusted under 35 U.S.C. 154(b) by 225 days.

(21) Appl. No.: 14/832,627

(22) Filed: Aug. 21, 2015

(51) Int. Cl.
| | | |
|---|---|---|
| G06F 15/16 | (2006.01) | |
| H04L 29/06 | (2006.01) | |
| H04L 12/26 | (2006.01) | |
| G06F 3/033 | (2013.01) | |
| G06F 3/0484 | (2013.01) | |
| G09B 5/06 | (2006.01) | |
| G06F 9/451 | (2018.01) | |

(52) U.S. Cl.
CPC .......... *H04L 65/4092* (2013.01); *G06F 3/033* (2013.01); *G06F 3/0484* (2013.01); *G06F 9/453* (2018.02); *G09B 5/06* (2013.01); *H04L 43/106* (2013.01); *H04L 65/604* (2013.01)

(58) Field of Classification Search
CPC . H04L 65/4092; H04L 65/604; H04L 43/106; G06F 3/033; G06F 3/0484; G06F 9/453; G09B 5/06
USPC ........................................................ 709/219
See application file for complete search history.

(56) References Cited

U.S. PATENT DOCUMENTS

| | | | | |
|---|---|---|---|---|
| 5,442,759 A * | 8/1995 | Chiang | ................ | G06Q 50/205 434/118 |
| 5,577,186 A * | 11/1996 | Mann, II | ................ | G09B 5/065 715/201 |
| 6,219,047 B1 * | 4/2001 | Bell | ...................... | G06F 9/4446 715/705 |
| 2004/0145601 A1 * | 7/2004 | Brielmann | ............ | G06F 9/4446 715/708 |
| 2010/0180292 A1 * | 7/2010 | Epstein | .............. | H04N 5/44513 725/32 |
| 2013/0129316 A1 * | 5/2013 | Dontcheva | ............... | H04N 5/76 386/241 |
| 2014/0047334 A1 * | 2/2014 | Nouard | .............. | G06Q 30/0185 715/705 |
| 2015/0044642 A1 * | 2/2015 | Resig | ........................ | G06F 8/33 434/118 |

(Continued)

*Primary Examiner* — James E Springer
(74) *Attorney, Agent, or Firm* — Baker & Hostetler LLP

(57) ABSTRACT

Techniques for in-application demonstration using video and data streams are described herein. A video stream comprising video data that includes an instructional video may be received and played. A data stream associated with the video stream may be received at least partially concurrently with, or during, receiving of the video stream. It may then be determined when the playing of the video stream proceeds to a first data location, and the playing of the video stream may be stopped. A first portion of data within the data stream that is associated with the first data location within the video stream may then be identified. The first portion of data may include an indication of at least one operation performable within an executing application. Instructions may then be provided, based at least in part on the first portion of data, for performing the at least one operation within the executing application.

20 Claims, 10 Drawing Sheets

(56) References Cited

U.S. PATENT DOCUMENTS

| | | | |
|---|---|---|---|
| 2015/0139618 A1* | 5/2015 | Chakra | H04N 21/252 386/287 |
| 2015/0168937 A1* | 6/2015 | Michalscheck | G05B 19/05 700/83 |
| 2016/0085366 A1* | 3/2016 | Chi | G06F 3/0488 345/173 |
| 2017/0053556 A1* | 2/2017 | Niederhaus | G09B 5/02 |
| 2017/0083348 A1* | 3/2017 | Mody | G06F 9/4446 |

* cited by examiner

IN-APPLICATION DEMONSTRATION USING VIDEO AND DATA STREAMS

BACKGROUND

With the creation of a multiplicity of new and widely different applications designed to execute on a variety of devices, instructional materials on how to use various functions in these applications are becoming increasingly important. Traditional help menus may fail to describe, in an efficient way, the implementation of various functions that require multiple steps, or otherwise require complex steps or inputs to effectuate in a given application, such as a productivity or business application, a content development application, a video game or other content item, and others. In these and other contexts, instructional videos may provide assistance and instructions to aid in the performance of certain functions or actions in the application. However, current instructional videos may be limited with respect to their ability to easily and effectively demonstrate performance of various operations. For example, it may often be difficult for users to learn and understand an operation without seeing the operation performed directly within an application that actually executes on the user's own device. While instructional videos may sometimes show video of an operation being performed in an application, the application executes on a device shown in the video as opposed to actually executing on the user's own device. Thus, the user may be unable to fully appreciate how performance of the applications looks on the user's own device. For example, an operation may sometimes involve interaction with various menu items, and the user may be unable to see such menu items being interacted with inside an executing application on the user's own device.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
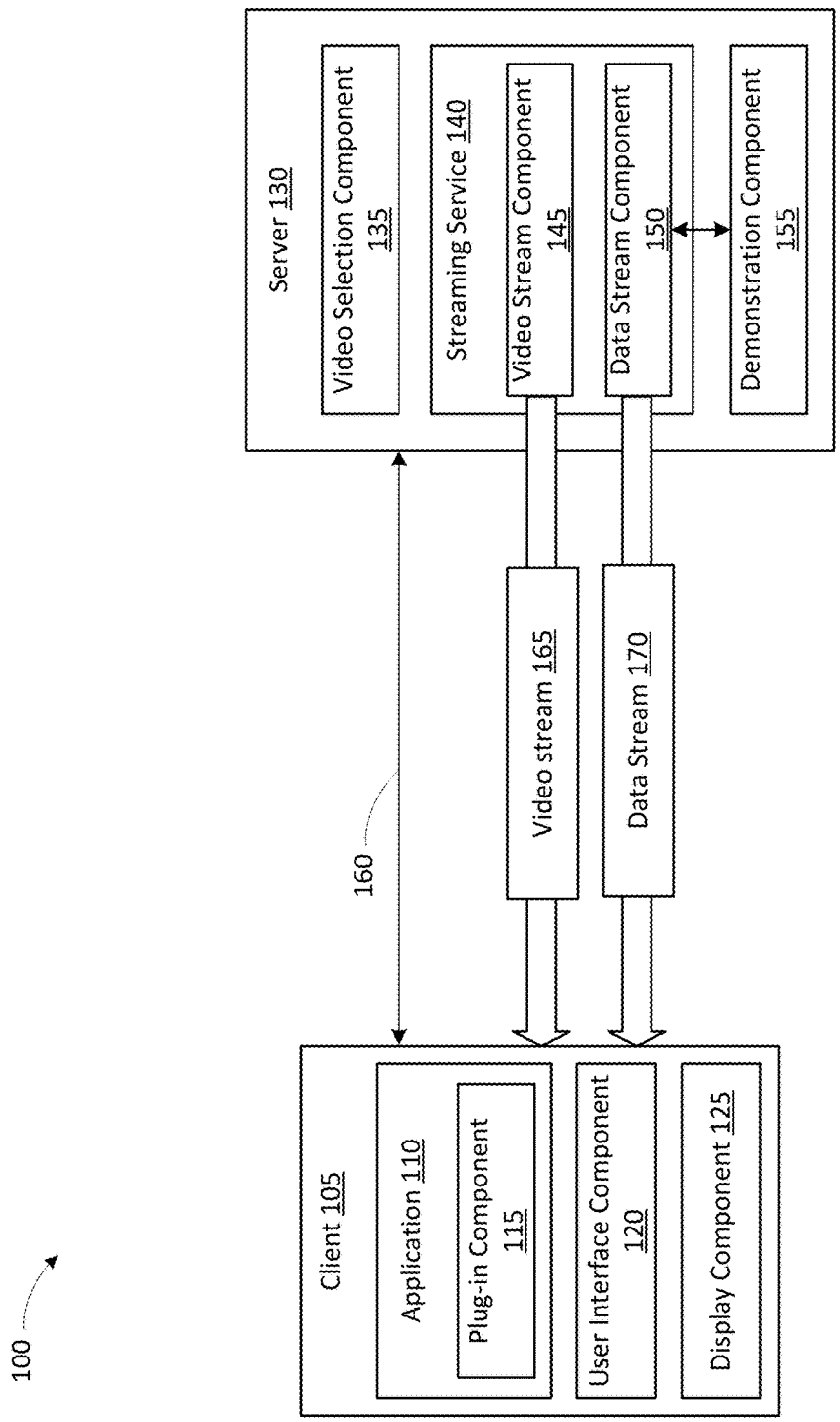
FIG. 1 is a diagram illustrating an example system for in-application demonstration using video and data streams that may be used in accordance with the present disclosure.

Techniques for in-application demonstration using video and data streams are described herein. In some cases, in order to better utilize features of an application, such as a productivity or business application, a content development application, a video game or other content item, and others, directed demonstrations within the executing application alongside an instructional video may be provided. These directed demonstrations may occur within an executing application itself, thus requiring little, if any, translation between operations that may be described in the instructional video and operations performed within the application on a client device. In some examples, some aspects of the disclosed techniques may be implemented using a plug-in component that is inserted into, or that otherwise interacts with, the executing application to provide demonstrations of various features of the executing application. The plug-in component may, for example, function as an interpreter of instructions received, for example from a video and data streaming service, to interface with the executing application and drive demonstrations. As will be described in greater detail below, by utilizing a plug-in component that can interact directly with the executing program, the described techniques may, in some cases, be implemented across a variety of applications, potentially in a platform-agnostic manner.

As described herein, techniques for providing a demonstration within an executing application may include receiving and playing a video stream comprising video data that includes an instructional video, such as a tutorial. At least partially concurrently with, or during, receiving and playing the video stream, a data stream associated with the video stream may also be received. In some examples, the video stream and/or the data stream may be provided by a video and data streaming service and received by a plug-in component executing on a client device in conjunction with the executing program. During playing of the video stream, the plug-in component may determine when the video stream proceeds to a first data location. Subsequently, the playing of the video stream may be stopped. A first portion of data within the data stream that is associated with the first data location within the video stream may be identified. The first portion of data may include an indication of at least one operation performable within the executing application. In some examples, the indication of the at least one operation may include an indication of one or more identifiers, e.g., unique identifiers, each associated with a control within the application. The controls may include selectable items that enable control of the executing application, such as a menu items, icons, buttons, sliders, etc. Based at least in part on the identified first portion of data, instructions for performing the at least one operation within the executing application may be provided, for example, to the plug-in component. In some examples, the instructions for performing the at least one operation may include instructions for determining a screen location associated with a control, for causing a pointer or cursor to move to the screen location, and for selecting the control. Upon performance of the operation, the playing of the video stream may be resumed.

In some examples, identifying the portion of data within the data stream that is associated with the first data location within the video stream may include identifying, within the video stream, a first timestamp value associated with the first data location, searching, within the data stream, for a portion of data associated with the first timestamp value, and determining that the first portion of data within the data stream is associated with the first timestamp value. In this way, the video stream and the data stream may be coordinated, even when not transmitted in exact synchronization, to provide instructions and demonstrations of the performance of one or more operations to a user, for example, via a user interface provided by the program or application executing on the client device.

In some cases, the demonstration of an operation within the executing program may be interrupted at any time, for example, via user input. The demonstration may pause or cease to execute in response to the user input. If no user inputs are detected during the execution of the demonstration, upon determining that the demonstration of the operation has completed, the video stream may resume playing. In some cases, determining that the demonstration of an operation has completed may include receiving an invocation of a callback function.

FIG. 1 is a diagram illustrating an example system 100 for in-application demonstration using video and data streams that may be used in accordance with the present disclosure. As shown, system 100 includes a client 105 in communication with a server 130 via communication link 160. The client 105 may include any of a number of devices, such as a smart phone, tablet, laptop, computer, or other computing device or node. The server 130, which may be remote from the client 105, may be distributed across any number of computing devices or nodes. Communication link 160 may include, for example, one or more computing networks, for example a local area network (LAN) and/or a wide area network (WAN), such as the Internet.

The client 105 may execute an application 110, which may be associated with a plug-in component 115. The client 105 may also include a user interface component 120, which, in conjunction with a display component 125, may present and enable interaction with application 110. The display component 125 may include a screen or touchscreen, for example, of various sizes, shapes, configurations, etc. The server 130 may include a video selection component 135, a streaming service 140 and a demonstration component 155. The streaming service 140 may further include a video streaming component 145 and a data streaming component 150, which may provide video stream 165 and data stream 170 respectively, for example, to the client 105.

In some examples, the streaming service 140 may provide instructional videos, for example associated with an application or program 110 executing on the client 105, via video stream 165 transmitted by the video streaming component 145. In some cases, upon initializing an application 110, the client 105 may communicate characteristics associated with the application 110 and/or client 105 (e.g., application name, type, version, client type, operating system, screen size, processing and memory capabilities, audio capabilities, etc.) to server 130, for example, via link 160. Also, in some examples, the client 105 may communicate to server 130 indications of particular application features and/or operations for which instruction may be desired. The video selection component 135 of the server 130 may then select one or more video items for transmission to the client 105 based on, for example, the characteristics of the application 110 and/or the client 105 as well as the application features and/or operations for which instruction is desired. The video selection component 135 may provide or indicate the selected video items to the video streaming component 145. The video streaming component 145 may then transmit the selected video data via video stream 165 to the client 105.

In some examples, a plug-in component 115 may be installed on the client 105, for example, and associated with application 110. In some cases, the plug-in component 115 may be operable with a number of applications 110 installed on client 105, or may be an application-specific plug-in. The plug-in component 115 may be configured to receive instructions for displaying video stream 165 within a user interface of an application 110. The plug-in component 115 may also be configured to receive instructions, for example in data stream 170, to drive various operations within application 110. In some examples, the plug-in component 115 may act or perform the functions of an interpreter, such that it may drive the application 110 based on information provided in the data stream 170. Also, in some examples, the plug-in component 115 may operate in a platform agnostic manner, for example in which the ability of the plug-in component 115 may not be affected, or may be only minimally affected, by changes in operating system, device, or, in some cases, different versions of the application 110. The client 105 may download instructions associated with the plug-in component 115, for example from the server 130. The application 110 or the plug-in component 115 may receive the video stream 165 and instruct the user interface component 120 and/or the display component 125 to display a video including the video stream 165 in combination with the executing application 110, for example, in response to receiving user input. In some examples, as will be described in greater detail below, the video may be displayed in a pop-up box or other area, such as in a corner of a displayed user interface.

The video stream 165 may be used to transmit, for example, one or more instructional videos. The term instructional video, as used herein, generally refers to a video that provides instructions and/or information regarding one or more operations and/or features, for example of the application 110. In some aspects, the instructional videos may include visual and/or text-based instructions and explanations regarding various operations performable within the application 110. In some examples, the instructional videos may be organized based on individual functions, controls or menu items provided in the application 110, and the like.

In addition to providing video stream 165, the streaming service 140 may also provide data stream 170. The data stream 170 may include instructions, for example to the plug-in component 115, for performing one or more operations within executing application 110. In some cases, the instructions may include identifiers associated with specific controls, menu items, and/or actions in the application 110 that may enable the plug-in component 115 to control application 110 for demonstration of one or more operations within application 110. In some examples, the data stream 170 may include instructions that correspond to certain features presented in a video item transmitted using the video stream 165. For example, the data stream 170 may include instructions for the plug-in component 115 to execute a first operation that is also explained and/or described a video item. Details of the data stream 170 will be described in greater detail below, for example with reference to FIG. 6.

Video stream 165 and data stream 170 may be transmitted using streaming delivery techniques, in which data may be transmitted and may potentially be processed and/or presented in a steady flow. This may allow, for example, playing of portions of video stream 165 at the client 105 to proceed while subsequent portions of the video stream 165 are being transmitted and received. This may also allow, for example, portions of data stream 170 to be received and processed at the client 105 while subsequent portions of the data stream 170 are being transmitted and received.

In some examples, an instructional video and corresponding data may be stored as a single item for transmission together via video stream 165 and data stream 170. Also, in some examples there may be multiple different data collections that may correspond to a single instructional video, for example when different data collections may be desirable for different clients or different application versions that may not necessarily benefit from separate video items. In these examples, an appropriate data collection may be selected for transmission together with an instructional video based on, for example, characteristics of the application and/or client.

In some examples, an attempt may be made to tightly synchronize transmission of the video stream, 165 and the data stream 170 such that portions of the data stream 170 may be transmitted and received close to times at which corresponding portions of the video stream 165 are transmitted and received. For example, in some cases, transmission of an instructional video via video stream 165 and corresponding data via the data stream 170 may be initiated at the same time, or very close to the same time, in an attempt to help synchronize transmission of the video and its corresponding data. Despite these efforts, however, it may often be quite difficult, and sometimes impossible, to ensure that transmission of a video item and its corresponding data are perfectly synchronized. One approach to dealing with this lack of perfect synchronization involves the use of timestamps that may be applied to the video stream 165 and the data stream 170. In some examples, the timestamps may be used to match and coordinate portions of the video stream 165 with corresponding portions of the data stream 170. For example, in some cases, a portion of data stream 170 that corresponds to a respective frame or other portion of video stream 165 may be determined by identifying a timestamp value assigned to the respective portion of the video stream 165 and then finding a portion of the data stream 170 that is assigned a matching timestamp value. In some examples, timestamps may be assigned to video stream 165 and/or data stream 170 when they are being transmitted and/or may be pre-assigned at some prior time.

Upon receiving the video stream 165 and data stream 170, the plug-in component 115 may determine when playing of the video stream 165 proceeds to a first data location. The first data location may be, for example, a frame or other data location at which the video stream is to be stopped to enable a demonstration within the application 110. In some examples, a trigger or other indicator may be inserted into the video stream 165 that identifies the first data location as a location at which the video stream 165 is to be paused or otherwise stopped. Also, in some examples, the plug-in component 115 may the monitor the incoming video stream to detect a trigger or other indicator that identifies the first data location within the video stream 165. In some cases, upon determining that the first data location has been reached in the video stream 165, the plug-in component 115 may stop the presentation or playing of the video stream 165. The plug-in component 115 may then identify a first portion of data within the data stream 170 that is associated with the first data location within the video stream 165. In some cases, the first portion of data within data stream 170 includes an indication of the operation performable within the executing application 110, which may include an identifier of one or more controls, menu items, or actions in, or associated with, application 110. In some examples, each identifier of a control within application 110 may be unique, such the identifier may enable the control to be identified and distinguished from other application controls. Also, in some examples, control identifiers may be version-independent, such that a unique identifier associated with a certain control may be universal across different applications versions, device types, operating systems, etc.

The plug-in component 115 may, in response to identifying the first portion of data in the data stream 170, provide instructions for performing the at least one operation within the executing application 110. In some cases, the instructions may be provided to the plug-in component 115 to control/cause the application 110 to perform the at least one operation. The performance of the at least one operation may be displayed in a user interface associated with application 110, for example, provided by user interface component 120 and display component 125. In some cases, the instructions may include instructions for determining a screen location associated with a control, for causing a pointer or cursor to move to the screen location, and for selecting the control in the application 110. The at least one operation may include one or more of a variety of control selections to effectuate performance of the at least one operation. Upon completion of the performance of the at least one operation, playing of the video stream 165 may be resumed. In some cases, the plug-in component 115 may determine that the operation has been performed, and may resume the playing of the video stream 165 based, at least in part, on determining that the operation has been performed. In some cases, the data stream 170 may include instructions for determining that the operation has been performed based, at least in part, on receiving an invocation of a callback function that indicates completion of the operation or any portions thereof.

In some cases, the plug-in component 115 may identify the portion of data within the data stream 170 that is associated with the first data location within the video stream 165 by identifying, within the video stream 165, a first timestamp value associated with the first data location. The plug-in component 115 may then search, within the data stream 170, for a portion of data associated with the first timestamp value, and determine that the first portion of data within the data stream 170 is associated with the first timestamp value. In this way, the video stream 165 and the data stream 170 may be coordinated to provide relevant demonstrations of operations within application 110. This coordination may enhance the user experience by, for example, providing the option to enable demonstrations of the performance of one or more operations within executing application 110 at or near a time when the same operations may be described or presented via video stream 165.

Figure 2:
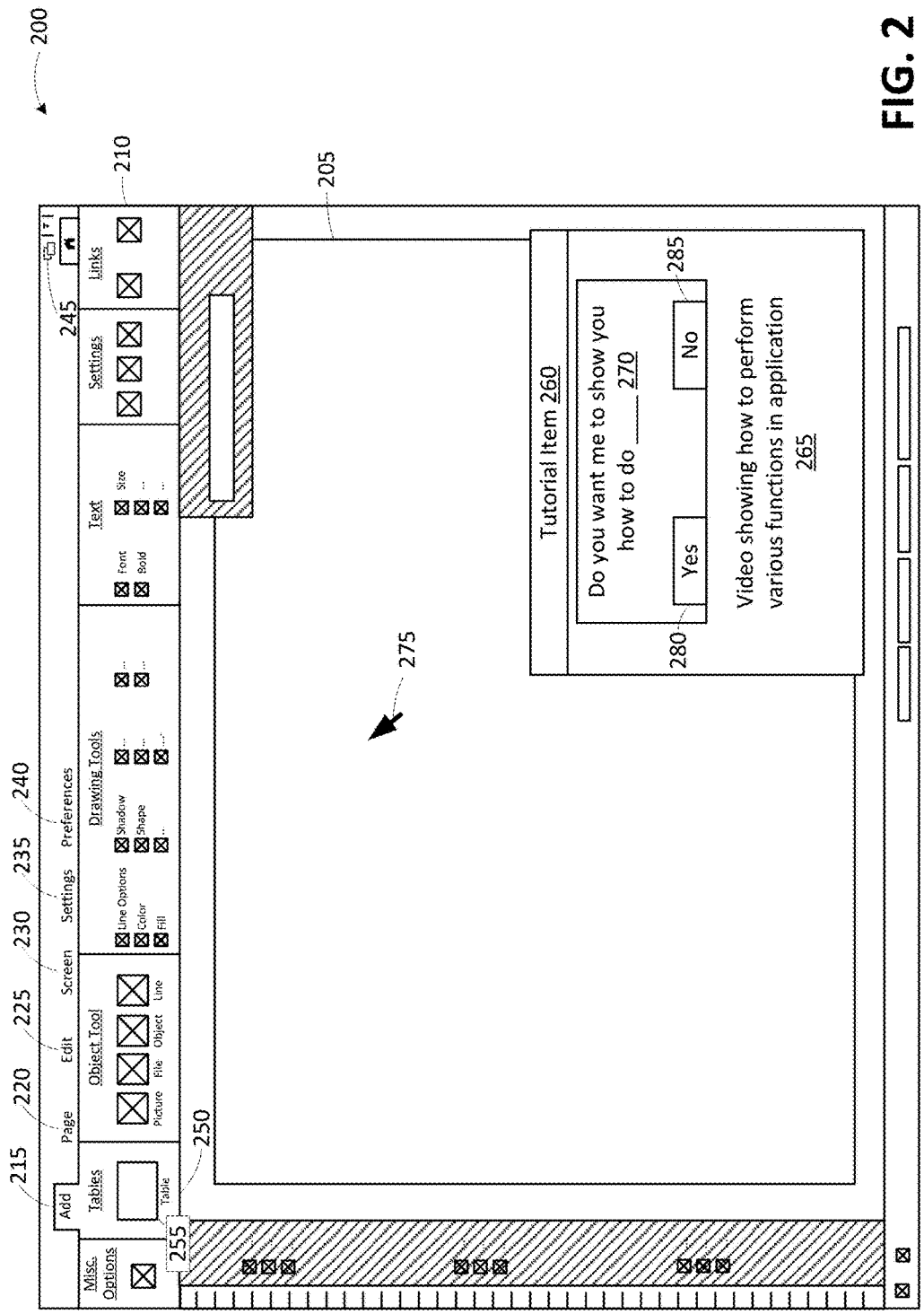
FIG. 2 is a diagram illustrating an example application user interface prior to operation demonstration that may be used in accordance with the present disclosure.

FIG. 2 is a diagram illustrating an example application user interface 200 prior to operation demonstration that may be used in accordance with the present disclosure. The user interface 200 may be provided by the user interface component 120 and displayed by display component 125 in conjunction with an application 110, as described above in reference to FIG. 1. In the example of FIG. 2, application 110 is a word processing application. However, it is noted that the described techniques may be used to demonstrate features in any number of different types of applications, such as a productivity or business application, a content development application, a video game or other content item, and others.

User interface 200 may include a text entry area or window 205 and various controls 215-255 via area 210. Area 210 may include menu items Add 215, Page 220, Edit 225, Screen 230, Settings 235, and Preferences 240, each of which, upon selection, may display further related menu items. Area 210 may provide various other controls, such as area adjustment control 245. User interface 200 may also include or display a cursor or pointer 275, which may be displayed and positioned, relative to different areas or controls of user interface 200, and may be used to select the various menu items or sub-menu items or controls, for example via one or more input devices associated with client 105 (e.g., a mouse or touchscreen). As illustrated, the Add menu item 215 is selected, which in turn causes the display of related items in area 250, including table item 255 and other items.

As described herein, an area or item 260, which may be referred to as a tutorial area, may be provided in the user interface 200 that provides instructions, such as a video 265, which may be transmitted using video stream 165. Video 265 may relate to operations/functions performable within executing application 110. Item 260 may be displayed or caused to be displayed by plug-in component 115. In some examples, the particular video 265 displayed in item 260 may be selected based on which menu items are currently selected or displayed. For example, as illustrated, the Add item 215 is selected. Accordingly, in some examples, the video 265 may include video corresponding to operations associated with the selected Add item 215. As set forth above, a first data location within the video 265 at which the video may be stopped for a demonstration may be detected, for example, using a trigger or other indicator inserted into the video stream. For example, a first data location within the video 265 may correspond to a point at which the video may be stopped to enable a demonstration of adding and configuring a table. Upon detection of the first data location, the video 265 may be paused or otherwise stopped and a pop-up area 270 may be displayed in user interface 200, such as covering or partially covering item 260. The pop-up area 270 may provide a selection 280 for enabling a demonstration of at least one operation associated with the first data location.

As also set forth above, the plug-in component 115 may, in response to detecting the first data location in the video 265, identify a portion of data within data stream 170 that corresponds to the first data location, such as by matching timestamps for the first data location and the corresponding portion of data in the data stream 170. In some examples, the corresponding portion of data in the data stream 170 may include instructions for displaying pop-up area 270. The pop-up area 270 may prompt a user to make a positive or negative selection 280, 285 of whether to display a demonstration of an operation or feature in user interface 200.

Figure 3:
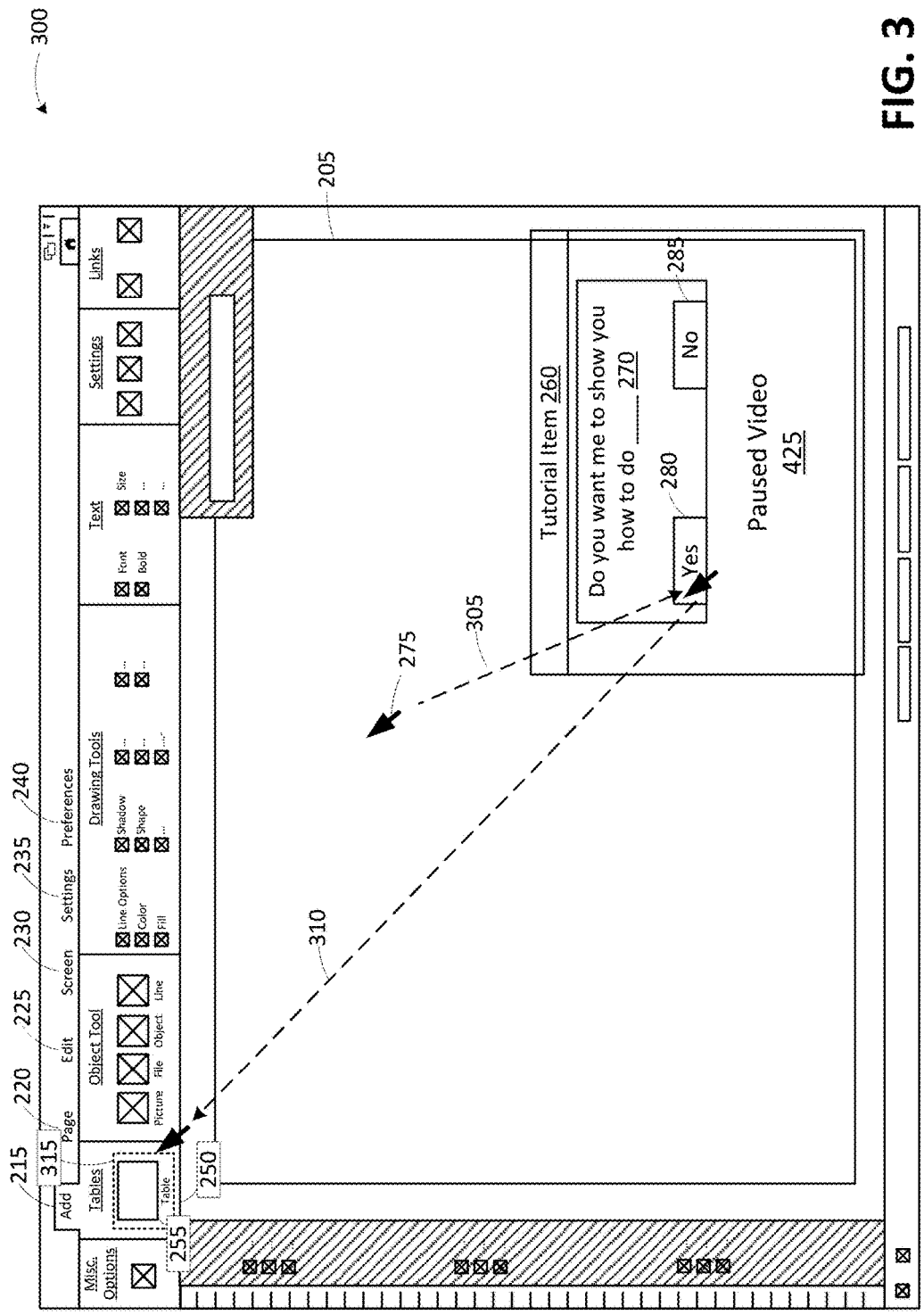
FIG. 3 is a diagram illustrating an example menu item selection that may be used in accordance with the present disclosure.
Figure 4:
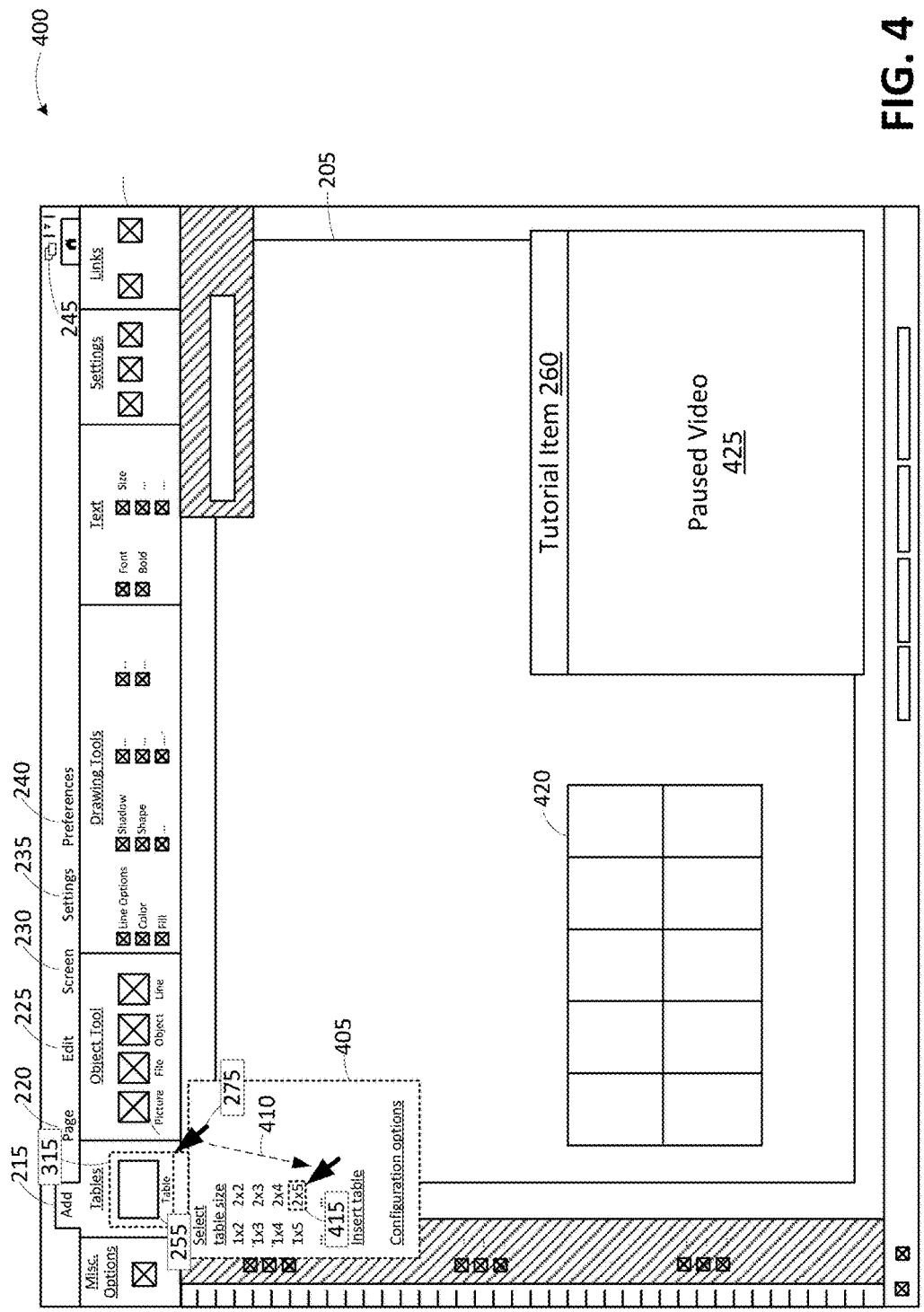
FIG. 4 is a diagram illustrating an example sub-menu item selection that may be used in accordance with the present disclosure.
Figure 5:
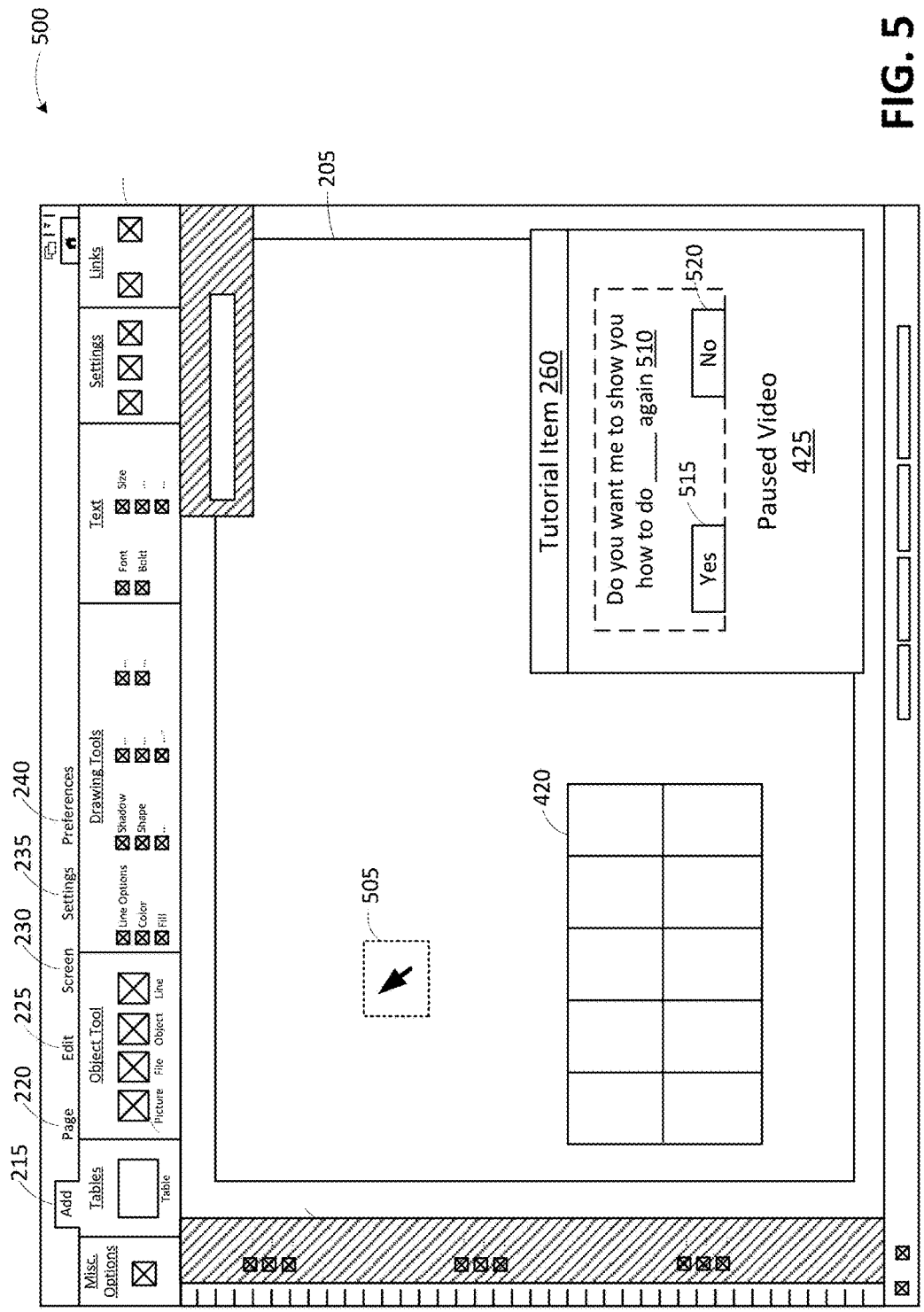
FIG. 5 is a diagram illustrating an example application user interface after operation demonstration that may be used in accordance with the present disclosure.

FIGS. 3-5 illustrate different displays or states 300, 400, 500 of user interface 200 described above in reference to FIG. 2, associated with providing a demonstration of the operation of configuring a table in a word processing application. In particular, as shown in display 300 of FIG. 3, the detection of the first data location within the video 265 may cause a paused video indication 425 to be displayed in tutorial item 260. Additionally, a user, for example in response to the display of pop-up area 270, may move pointer 275 to the positive selection 280 associated with pop-up area 270, as indicated by dotted line 305. Upon receiving selection 280 to enable the demonstration indicated by pop-up 270, the plug-in component 115 may control or direct the pointer 275 to select a control associated with the selected operation. In the example illustrated, the demonstration/operations may include configuring, inserting, and editing a table into a document or file displayed in area 205. In some examples, the demonstration may include selection of the table item 255, which, as set forth above, may be associated with a unique identification, which may be used to identify the table item 255 and to distinguish the table item 255 from other menu items and controls. In some cases, the data stream 170 may include instructions to select the table item 255, such as by including the unique identifier for the table item 255. Upon receiving the unique identifier of the table item 255, the plug-in component 115 may determine a location of the table item 255 within the user interface 200, for example based on a current state of application 110 (e.g., current selected menu items, screen configurations, etc.) as well as characteristics associated with the application 110 and/or client 105 (e.g., application version, screen size, etc.). The plug in component 115 may then provide instructions for moving the pointer 275 along path 310 to the table item 255 and selecting the table item 255. As shown in FIGS. 4 and 5 and described below, this and following portions of the demonstration may, for example, result in an actual table being inserted into a real document that is local to the user's machine. This may, in some cases, help the user to better visualize and understand the operation than, for example, merely watching a video or another such simulation.

With reference to FIG. 4, display 400 illustrates a sub-menu area 405 being displayed upon selection 315 of the table item 255. Each sub-menu item or control, such as sub-menu item 415, which indicates a 2×5 cell table, may also be associated with a unique identifier, to enable identification and selection of the item. In some examples, the plug-in component 115 may receive a callback, e.g., through invocation of a callback function, indicating that the table item 255 has been selected. In some examples, the data stream 170 may further include instructions to perform additional operations upon receipt of a callback indicating that the table item 255 has been selected. In particular, the data stream 170 may include instructions to select the 2×5 cell table sub-menu item 415, such as by including the unique identifier for the sub-menu item 415. Upon receiving the unique identifier of the sub-menu item 415, the plug-in component 115 may determine a location of the sub-menu item 415 within the user interface 200, for example based on a current state of application 110 (e.g., current selected menu items, screen configurations, etc.) as well as characteristics associated with the application 110 and/or client 105 (e.g., application version, screen size, etc.). The plug in component 115 may then provide instructions for moving the pointer 275 along path 410 to the sub-menu item 415 and selecting the sub-menu item 415. Upon selection of sub-menu item 415, table 420 may be displayed in area 205. As set forth above, table 420 may be inserted into a document that is local to the user's machine.

In one example, the demonstration may be paused or interrupted, such as via receipt of a user input. The user input may include moving the pointer 275, such as by interacting with a mouse, touchscreen, or other input control of the client 105. Upon receipt of a user input for interrupting the demonstration, the plug-in component 115 may stop executing instructions for preforming the demonstration, such as by stopping movement of the pointer 275. Additionally or alternatively, a pop-up area may be displayed (not shown), requesting further input as to whether to proceed or stop preforming the demonstration. In this way, the demonstration may be presented in an easily accessible way that may not detract from the application 110 itself. By enabling a pause or cancel feature of the demonstration, the user experience may additionally be enhanced by enabling further user interacting with the application 110, such as by allowing the user to interact with elements associated with demonstration, to attempt to successfully repeat the operations performed in the demonstration, and other interactions.

With reference to FIG. 5, display 500 illustrates the completion of the demonstration of operations relating to selection and configuration of a table. Upon completion of the one or more operations associated with the selected demonstration, the pointer 275 may be moved to a resting position 505, for example in a central location within user interface 200. Also, upon completion of the one or more operations associated with the selected demonstration, another pop-up area 510 may be displayed requesting input to select whether the demonstration is to be replayed. Upon selection of a positive selection 515, the demonstration, as illustrated in FIGS. 3 and 4 may be re-performed. On the other hand, upon a negative selection 520, the playing of video 265 may be resumed in tutorial item 260.

In some examples, the changes made during the demonstration to the application 110, such as the insertion of table 420 described above, may be deleted or undone. In some cases, a selection window or pop-up may be displayed requesting a retaining or discarding selection for the demonstration-based changes to the application 110 (e.g., insertion of the table 420, etc.).

It should be appreciated that the table insertion operation, as described above, is only given by way of example. The techniques described herein may be similarly applied to various other applications, such as image editing applications, audio editing applications, graphic design applications, video games, and other applications and operations. In like manner, selectable items or actions within the applications may be associated with identifiers (e.g., unique identifiers). A string of instructions or commands including the identifiers pertinent to a given operation may be generated. The string of instructions may then be provided to, for example, a plug-in component associated with the application that may implement the demonstrations.

In one specific example, the application 110 may be a video game development application, and an instructional video may be used to show developers how to perform various operations, such as creating graphical objects, defining states, defining relationships between states, and other operations. The data stream 170 may then include instructions for identifying, locating, and selecting menu items or other controls that may used to demonstrate these operations. In yet another specific example, the instructional video may include a broadcast of commentary associated with a video game, such as commentary or instructions for performing certain operations within the video game. For example, the data stream may include instructions for performing certain actions within the video game, such as fight moves and other actions.

Also, in some examples, subsequent to a demonstration, a user may attempt to perform one or more particular operations that were depicted in the demonstration. In these examples, the data stream 170 may sometimes include instructions that allow the plug-in component to monitor a series of actions performed by a user, such as through callbacks or other action confirmation techniques, to make a determination as to whether a user has successfully repeated one or more demonstrated operations. In some specific examples, a user may be required to perform one or more operations within a certain time period. In these examples, the data stream 170 may require the plug-in component to request and receive, within a specified time period, a callback indicating that the operation has been performed.

As yet another example, the described techniques may sometimes be employed to provide a live or near-live in-application demonstration. For example, a broadcaster may generate and provide an instructional video that is captured and recorded from the broadcaster's device and then broadcasted to other clients. The captured video may include, for example, display output form the broadcaster's device, video of the broadcaster captured using a camera, and/or other captured video data. In combination with capturing of the video data, a component may execute on the broadcaster's device to capture associated user input, such as mouse clicks and other movements, menu item and control selections, and the like. The data stream may then include instructions generated based, at least in part, on the captured user input. These instructions may then, for example, be provided using the data stream so as to allow the user input from the broadcaster to be demonstrated in an executing application on a client device.

Figure 6:
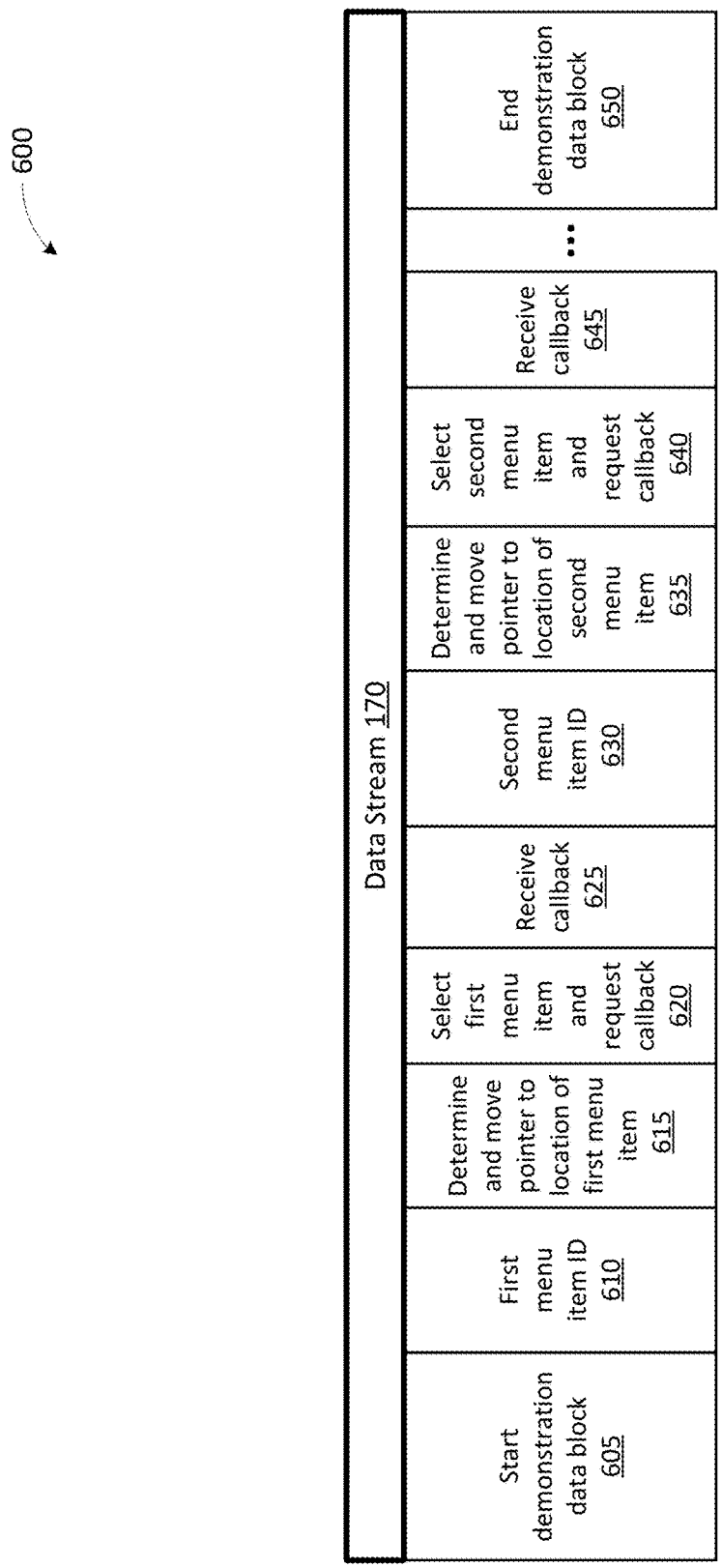
FIG. 6 is a diagram illustrating example data stream elements that may be used in accordance with the present disclosure.

FIG. 6 illustrates an example portion 600 of data stream 170, that may be provided by data streaming component 150 of the streaming service 140, as described above in reference to FIG. 1. The data stream 170 may be configured to correspond to parts or all of video stream 165, which may be transmitted at least partially concurrently with, or during, transmission of data stream 170. In some examples, the data stream 170 may be associated with one or more operations performable within an application 110. It should be appreciated that a single data stream 170 may include instructions associated with multiple operations, e.g., associated with multiple demonstrations, or multiple operations associated with a single demonstration. As shown, portion 600 begins with a start demonstration data block 605. As set forth above, in some examples, start demonstration data block 605 may have a timestamp value that matches a timestamp value of a first data location within an associated video stream 165 at which a video may be stopped for providing a corresponding in-application demonstration. As also set forth above, in some examples, the plug-in component 115 may examine both video stream 165 and data stream 170 in order to match the timestamp value of start demonstration data block 605 with a timestamp value of the first data location in the video stream 165.

The start demonstration data block 605 may indicate that following groups of instructions (e.g., instructions 610-645 in the example of FIG. 6) are associated with a particular demonstration, such as inserting a table into a document as shown in FIGS. 3-5. In some examples, the start demonstration data block 605 may include instructions for presenting a pop-up area, such as pop-up 270, requesting a selection that enables a user to request or confirm that a demonstration should be performed. In some other examples, the plug-in component 115 may generate the pop-up area 270, without instruction from the data stream 170.

The data stream 170 may also include instructions 610 indicating an identifier for a first menu item, such as an identifier for table item 255 of FIG. 3. As described above, a menu item identifier may uniquely identify and correspond to a selectable/available control or option within application 110, such as provided via user interface 200. The data stream 170 may also include instructions 615 to determine a location associated with the first menu item and to move a pointer, such as pointer 275, to the determined location. For example, as set forth above, the plug-in component 115 may determine a location of the table item 255 within the user interface 200, for example based on a current state of application 110 (e.g., current selected menu items, screen configurations, etc.) as well as characteristics associated with the application 110 and/or client 105 (e.g., application version, screen size, etc.). The plug-in component may also move a pointer to the determined location, such as along path 310 of FIG. 3. The data stream 170 may also include instructions 620 to select the first menu item and request a callback upon selection of the first menu item. The data stream 170 may subsequently include instructions 625 to wait to receive a callback indicating completion of selection of the first menu item.

The data stream 170 may also include instructions 630 indicating an identifier for a second menu item, such as an identifier for sub-menu item 415 of FIG. 4. The data stream 170 may also include instructions 635 to determine a location associated with the second menu item and to move a pointer, such as pointer 275, to the determined location. The data stream 170 may also include instructions 640 to select the second menu item and request a callback upon selection of the second menu item. The data stream 170 may subsequently include instructions 645 to wait to receive a callback indicating completion of selection of the second menu item.

The data stream 170 may also include additional instructions for performing any number of additional operations, as indicated by the ellipsis between instructions 645 and data block 650. The additional instructions may, in some examples, include groups of instructions for additional menu items, such as instructions 610-625 for the first menu item and instructions 630-645 for the second menu item. Subsequent to the instructions associated with a particular demonstration, data stream 170 may include an end demonstration data block 650, which may, in some examples, indicate an end of a group of instructions associated with a particular demonstration. In some examples, end demonstration data block 650 may include instructions to display an option for repeating the demonstration such as shown in pop-up area 510. End demonstration data block 650 may also, in some examples, serve as a trigger to resume playing of the stopped video item.

Figure 7A:
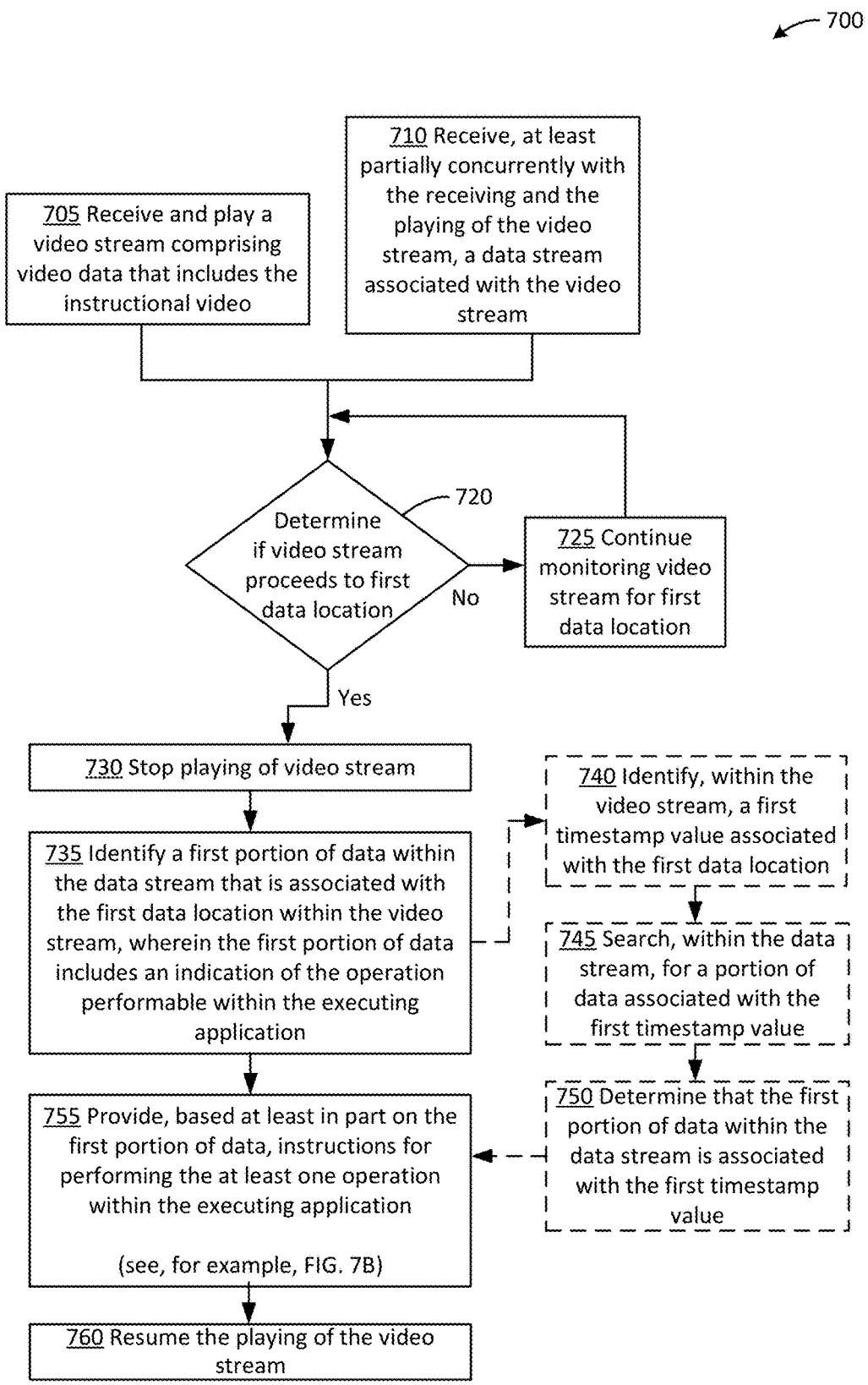
FIG. 7A is a flowchart illustrating an example process for in-application demonstration using video and data streams that may be used in accordance with the present disclosure.

FIG. 7A is a flowchart illustrating an example process 700 for in-application demonstration using video and data streams that may be used in accordance with the present disclosure. Process 700 may begin with receiving and playing a video stream comprising video data that includes an instructional video at operation 705. In some examples, the video stream may be provided by a streaming service, such as streaming service 140, to a client 105, for example executing an application 110. The video stream may be received by, for example, a plug-in or other component 115 associated with application 110 and may subsequently be played in connection with the executing application, for example, via a tutorial item 260 provided in a user interface 200 of the application 110. At operation 710, which may occur at least partially concurrently with, or during, operation 705, a data stream associated with the video stream may be received, for example, also by plug-in component 115.

The plug-in component 115 may then determine if the video stream 165 proceeds to a first data location at operation 720. As set forth above, the first data location may be, for example, a frame or other data location at which the video stream is to be stopped to enable a demonstration within the application 110. In some examples, a trigger or other indicator may be inserted into the video stream 165 that identifies the first data location as a location at which the video stream 165 is to be paused or otherwise stopped. Also, in some examples, the plug-in component 115 may the monitor the incoming video stream to detect a trigger or other indicator that identifies the first data location within the video stream 165.

If the video stream 165 has not proceeded to the first data location, then, at operation 725, the video stream 165 may continue to be monitored for the first data location. If, on the other hand, the video stream 165 has proceeded to the first data location, then the process 700 may proceed to operation 730, at which the playing of the video stream 165 may be stopped (e.g., paused). In some aspects, stopping the playing of the video stream may be performed by the plug-in component 115 and may cause the display of a paused video indication 425 in item or area 260.

Next, at operation 735, a first portion of data within the data stream 170 that is associated with the first data location is identified. In some examples, the first portion of data in the data stream 170 may include an indication of one or more operations performable within the executing application, such as selection of one or more menu items or controls, for example as shown in FIGS. 3 and 4 and described above.

In some implementations, operation 735 may include operations 740, 745, and 750, which may, for example, be performed by plug-in component 115. Operation 740 may include identifying, within the video stream 165, a first timestamp value associated with the first data location. As set forth above, in some example, portions of the video stream 165 and the data stream 170 may include timestamp values that may be used to coordinate the video stream 165 and the data stream 170. Next, operation 745 may include searching, within the data stream 170, for a portion of data associated with the first timestamp value (e.g., that has a timestamp value matching the first timestamp value). Next, at operation 750, it may be determined that the first portion of data within the data stream 170 is associated with the first timestamp value.

Figure 7B:
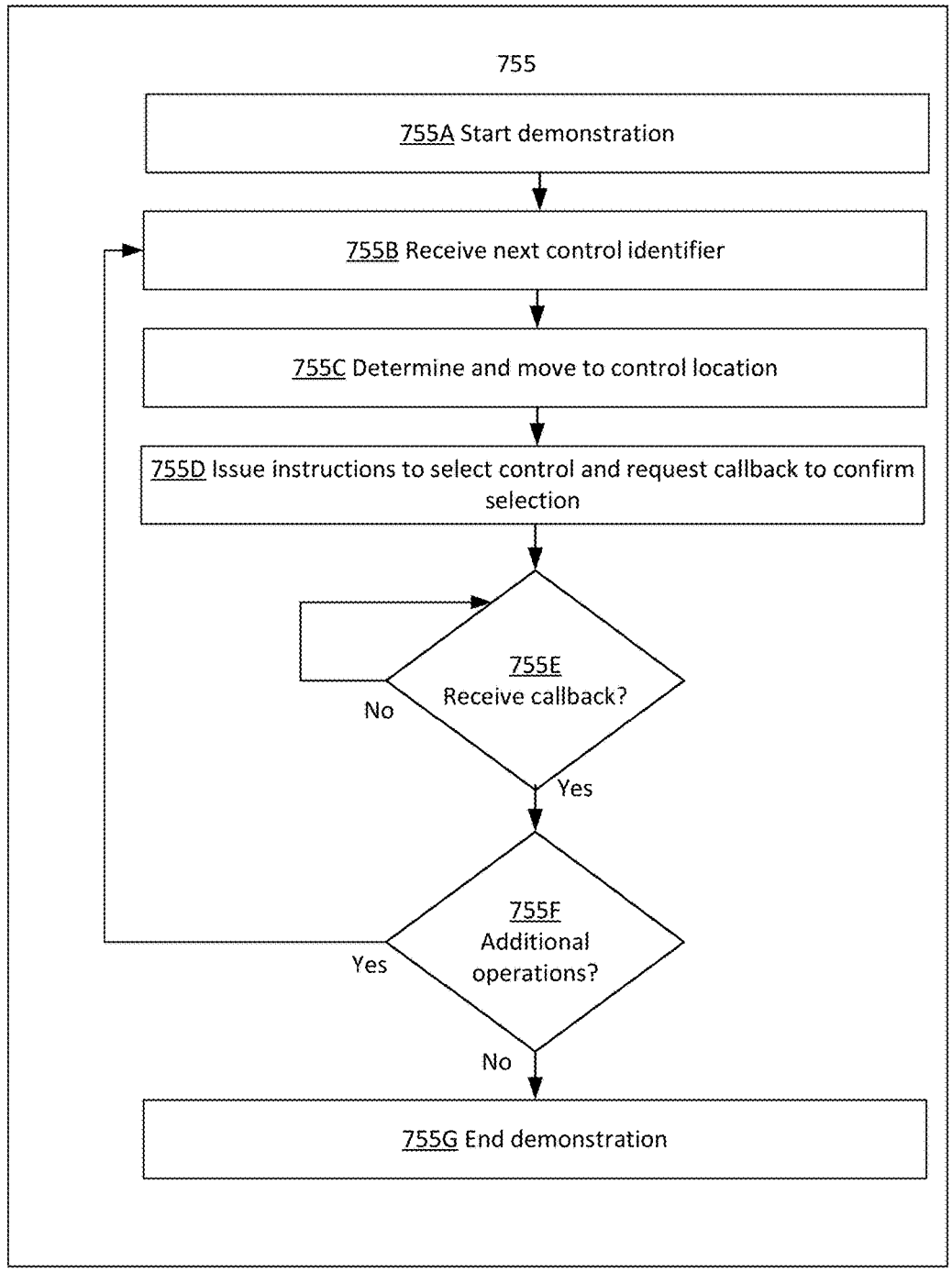
FIG. 7B is a flowchart illustrating an example process providing instructions for executing at least one operation within an application that may be used in accordance with the present disclosure.

Process 700 may then proceed to operation 755, where instructions are provided, based at least in part on the first portion of data, for performing the at least one operation within the executing application 110. As set forth above, in some examples, operation 755 may be performed by plug-in component 115. Also, in some examples, operation 755 may include example operations 755A-G, such as shown in FIG. 7B. In particular, at operation 755A, a demonstration is started, such as based on start demonstration data block 605 of FIG. 6 and described above. At operation 755B, an identifier of a next control is received, such as based on first menu item ID instructions 610 of FIG. 6 and described above. At operation 755C, a location associated with the identified control is determined and moved to, for example by moving a pointer or other input indicator to the location, such as based on instructions 615 of FIG. 6 and described above. As set forth above, in some examples, plug-in component 115 may determine a location of a control based on, for example, a current state of an application as well as characteristics associated with the application and/or client. At operation 755D, instructions are issued to select the control and a callback may be requested for confirming the selection, such as based on instructions 620 of FIG. 6 and described above. At operation 755E, it is determined whether a callback has been received. The process continues to loop through operation 755E until the callback is received. Upon receipt of the callback, it is determined, at operation 755F, whether there are any additional operations within the demonstration, such as indicated by instructions 630-645 of FIG. 6 and described above. If there are additional operations, then the process loops back to operation 755B. If there are no remaining additional operations, then the demonstration is ended at operation 755G.

Referring back to FIG. 7A, after providing of the instructions at operation 755, process 700 may conclude, at operation 760, with resuming the playing of the video stream 165. In some examples, the playing of the video stream may be resumed based, at least in part, on a determination that one or more operations associated with the application have been performed, such as based on receiving one or more callbacks. In some examples, it may not be necessary to perform all operations indicated in the data stream for a demonstration prior to resuming playing of the video stream 165. For example, in some cases, a user may request that play be resumed prior to completing the demonstration. Additionally, in some cases a user may interrupt a demonstration by, for example, moving a screen pointer or otherwise providing user input. Additionally, in some examples, prior to resuming of the playing of the video stream 165, a user may be provided with an option to repeat the demonstration, such as shown in pop-up area 510 of FIG. 5.

Figure 8:
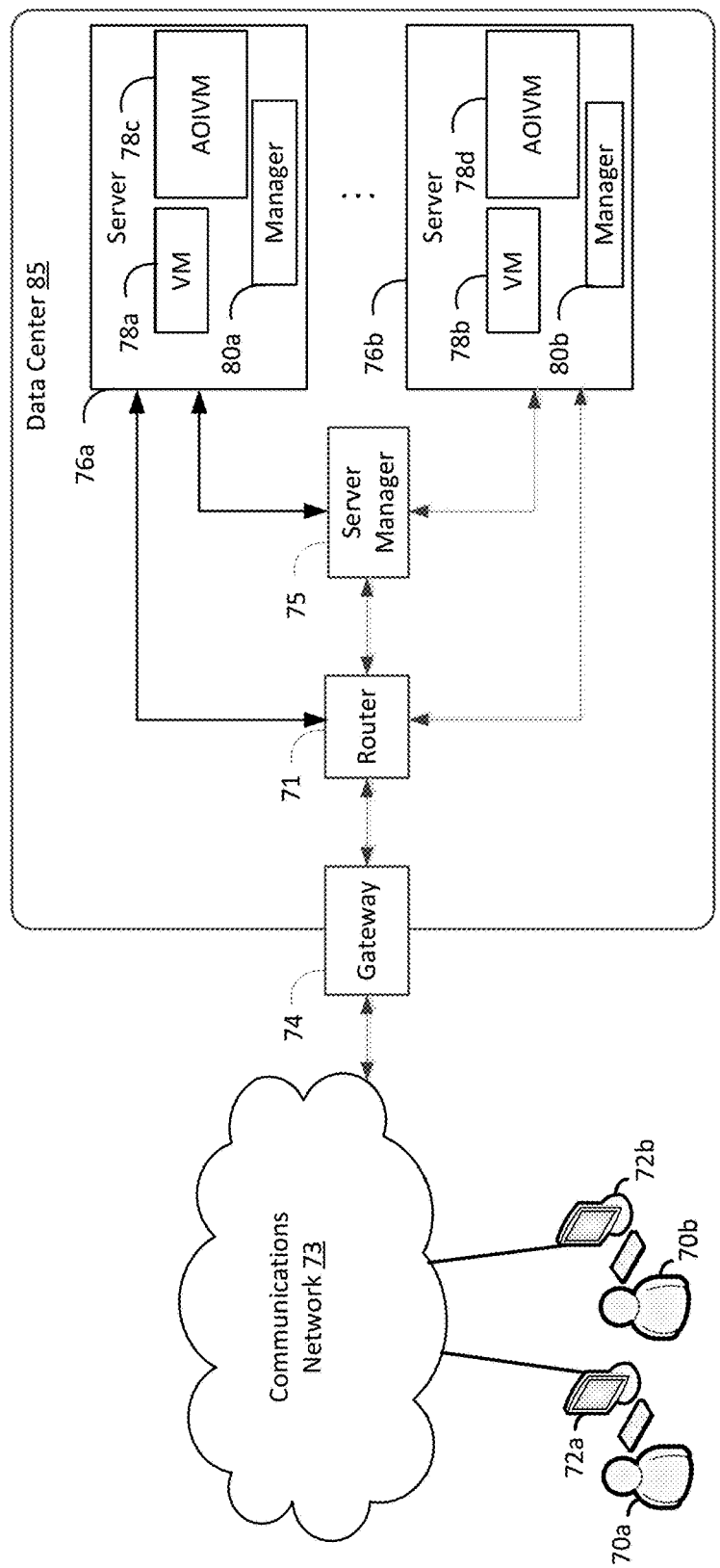
FIG. 8 is a diagram illustrating an example system for transmitting and providing data that may be used in accordance with the present disclosure.

An example system for transmitting and providing data, such as a video stream and/or a data stream, will now be described in detail. In particular, FIG. 8 illustrates an example computing environment in which the embodiments described herein may be implemented. FIG. 8 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are application demonstration virtual machine ("ADVM") instances. The ADVM virtual machine instances 78c and 78d may be configured to perform all, or any portion, of the techniques for demonstration of application operations using video and data streams and/or any other of the disclosed techniques in accordance with the present disclosure and described in detail above. As should be appreciated, while the particular example illustrated in FIG. 8 includes one ADVM virtual machine in each server, this is merely an example. A server may include more than one ADVM virtual machine or may not include any ADVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76*a* and 76*b*. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
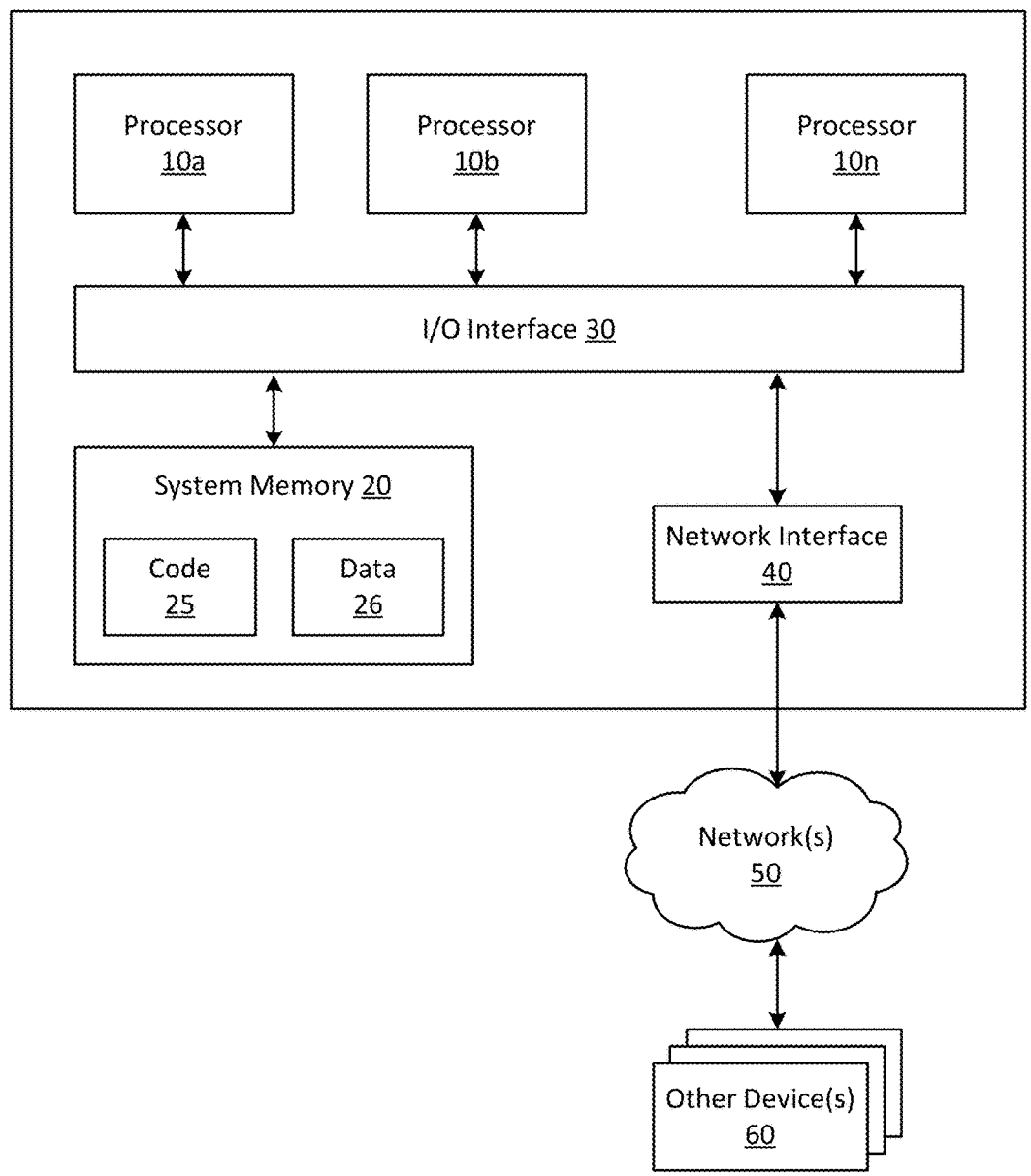
FIG. 9 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for demonstration, within an executing application, of at least one operation associated with an instructional video comprising:
   one or more processors;
   one or more memories having stored therein computer instructions that, upon execution by the one or more processors, cause at least the computing system to perform operations comprising:
      receiving and playing a video stream comprising video data that includes the instructional video;
      receiving, at least partially concurrently with the receiving and the playing of the video stream, a data stream associated with the video stream, wherein a plurality of data collections are associated with the video stream, wherein the data stream is associated with a first data collection of the plurality of data collections, and wherein the first data collection is selected based on one or more characteristics of the executing application and/or a client;
      determining when the playing of the video stream proceeds to a first data location within the video steam;
      stopping the playing of the video stream;
      identifying a first portion of data within the data stream that is associated with the first data location within the video stream, wherein the first portion of data includes an indication of the at least one operation performable within the executing application, the indication comprising first instructions for determining a screen location associated with a control, for causing a pointer or cursor to move to the screen location, and for selecting the control;
      providing, based at least in part on the first portion of data, second instructions for performing, by a component installed on the computing system, the at least one operation within the executing application;
      determining that the at least one operation has been performed; and
      resuming the playing of the video stream based, at least in part, on the determining that the at least one operation has been performed.

2. The computing system of claim 1, wherein at least the identifying and the providing are performed by a plug-in component that executes in combination with the executing application.

3. The computing system of claim 1, wherein identifying the first portion of data within the data stream that is associated with the first data location within the video stream comprises:
   identifying, within the video stream, a first timestamp value associated with the first data location;
   searching, within the data stream, for a first portion of data associated with the first timestamp value; and
   determining that the first portion of data within the data stream is associated with the first timestamp value.

4. The computing system of claim 1, wherein the indication further comprises an indication of an identifier associated with the control.

5. The computing system of claim 1, wherein the data stream comprises third instructions for determining that the at least one operation has been performed based, at least in part, on receiving an invocation of a callback function.

6. A method for demonstration, within an executing application, of at least one operation associated with an instructional video comprising:
   receiving and playing a video stream comprising video data that includes the instructional video;
   receiving, during the receiving and the playing of the video stream, a data stream associated with the video stream, wherein a plurality of data collections are associated with the video stream, wherein the data stream is associated with a first data collection of the plurality of data collections, and wherein the first data collection is selected based on one or more characteristics of the executing application and/or a client;
   determining when the playing of the video stream proceeds to a first data location within the video steam;
   stopping the playing of the video stream;
   identifying a first portion of data within the data stream that is associated with the first data location within the video stream, wherein the first portion of data includes an indication of the at least one operation performable within the executing application, the indication comprising first instructions for determining a screen location associated with a control, for causing a pointer or cursor to move to the screen location, and for selecting the control; and
   providing, based at least in part on the first portion of data, second instructions for performing, by a component installed on a computing system, the at least one operation within the executing application.

7. The method of claim 6, wherein the indication further comprises an indication of an identifier associated with the control.

8. The method of claim 6, wherein at least the identifying and the providing are performed by a plug-in component that executes in combination with the executing application.

9. The method of claim 6, wherein identifying the first portion of data within the data stream that is associated with the first data location within the video stream comprises:
   identifying, within the video stream, a first timestamp value associated with the first data location;
   searching, within the data stream, for a first portion of data associated with the first timestamp value; and
   determining that the first portion of data within the data stream is associated with the first timestamp value.

10. The method of claim 6, further comprising:
    detecting user input requesting interruption of performance of the at least one operation; and
    responsively causing performance of the at least one operation to be ceased.

11. The method of claim 6, further comprising:
    determining that the at least one operation has been performed; and
    resuming the playing of the video stream based, at least in part, on the determining that the at least one operation has been performed.

12. The method of claim 6, wherein the data stream comprises third instructions for determining that the at least one operation has been performed based, at least in part, on receiving an invocation of a callback function.

13. The method of claim 6, wherein the data stream comprises third instructions generated based, at least in part, on captured user input.

14. One or more non-transitory computer-readable storage media having stored thereon computing instructions that, upon execution by one or more compute nodes, cause the one or more compute nodes to perform operations comprising:

receiving and playing a video stream comprising video data that includes an instructional video;

receiving, during the receiving and the playing of the video stream, a data stream associated with the video stream, wherein a plurality of data collections are associated with the video stream, wherein the data stream is associated with a first data collection of the plurality of data collections, and wherein the first data collection is selected based on one or more characteristics of an executing application and/or a client;

determining when the playing of the video stream proceeds to a first data location within the video steam;

stopping the playing of the video stream;

identifying a first portion of data within the data stream that is associated with the first data location within the video stream, wherein the first portion of data includes an indication of at least one operation performable within the executing application, the indication comprising first instructions for determining a screen location associated with a control, for causing a pointer or cursor to move to the screen location, and for selecting the control; and providing, based at least in part on the first portion of data, second instructions for performing, by a component installed on a computing system, the at least one operation within the executing application.

15. The one or more non-transitory computer-readable storage media of claim 14, wherein the indication further comprises an indication of an identifier associated with the control.

16. The one or more non-transitory computer-readable storage media of claim 14, wherein at least the identifying and the providing are performed by a plug-in component that executes in combination with the executing application.

17. The one or more non-transitory computer-readable storage media of claim 14, wherein identifying the first portion of data within the data stream that is associated with the first data location within the video stream comprises:

identifying, within the video stream, a first timestamp value associated with the first data location;

searching, within the data stream, for a first portion of data associated with the first timestamp value; and determining that the first portion of data within the data stream is associated with the first timestamp value.

18. The one or more non-transitory computer-readable storage media of claim 14, wherein the operations further comprise:

detecting user input requesting interruption of performance of the at least one operation; and responsively causing performance of the at least one operation to be ceased.

19. The one or more non-transitory computer-readable storage media of claim 14, wherein the operations further comprise:

determining that the at least one operation has been performed; and resuming the playing of the video stream based, at least in part, on the determining that the at least one operation has been performed.

20. The one or more non-transitory computer-readable storage media of claim 14, wherein the data stream comprises third instructions for determining that the at least one operation has been performed based, at least in part, on receiving an invocation of a callback function.

\* \* \* \* \*